United States Patent [19]

Baba et al.

[11] Patent Number: 5,457,550
[45] Date of Patent: Oct. 10, 1995

[54] OPTICAL SCANNER UNIT HAVING RECURSIVE OPTICAL SYSTEM

[75] Inventors: Nobuyuki Baba, Sagamihara; Toshiyuki Inokuchi, Yokohama, both of Japan

[73] Assignee: Ricoh Company, Ltd., Tokyo, Japan

[21] Appl. No.: 841,541

[22] Filed: Feb. 26, 1992

[30] Foreign Application Priority Data

| Feb. 27, 1991 | [JP] | Japan | 3-56007 |
| Feb. 27, 1991 | [JP] | Japan | 3-56008 |
| Feb. 27, 1991 | [JP] | Japan | 3-56009 |
| Feb. 28, 1991 | [JP] | Japan | 3-33969 |

[51] Int. Cl.$^6$ .............................. G02B 5/32; G02B 26/10
[52] U.S. Cl. .......................... 359/18; 359/201; 359/204; 359/216
[58] Field of Search .............................. 359/17, 18, 201, 359/202, 204, 212, 216, 217, 15

[56] References Cited

U.S. PATENT DOCUMENTS

| 4,314,154 | 2/1982 | Minoura et al. ................... 359/201 |
| 4,415,224 | 11/1983 | Dickson ............................. 359/18 |
| 4,540,247 | 9/1985 | Nishi et al. ....................... 359/18 |
| 4,561,717 | 12/1985 | Kataoka et al. ................... 359/204 |
| 4,738,499 | 4/1988 | Mikami et al. .................... 359/18 |
| 4,832,429 | 5/1989 | Nagler .............................. 359/217 |
| 5,064,258 | 11/1991 | Inokuchi et al. ................... 359/17 |
| 5,113,279 | 5/1992 | Hanamoto et al. ............. 359/204 X |
| 5,251,055 | 10/1993 | Koide ............................ 359/204 X |

FOREIGN PATENT DOCUMENTS 1264059   10/1989   Japan .

Primary Examiner—William L. Sikes
Assistant Examiner—David R. Parsons
Attorney, Agent, or Firm—Oblon, Spivak, McClelland, Maier, & Neustadt

[57] ABSTRACT

An optical scanner unit for scanning a document includes a laser unit for emitting a laser beam used for scanning the document, an optical system in which the laser beam emitted from the laser unit travels to the document and a reflection light beam obtained by reflection of the laser beam on the document can turn back through the optical system, the optical system having a scanning device for moving the laser beam which passes through the optical system so that a two dimensional scanning of the document is carried out by the light beam, and an optical sensor for detecting the reflection light beam turning back through the optical system, wherein an image formed on the document is read based on results obtained by the optical sensor.

31 Claims, 9 Drawing Sheets

OPTICAL SCANNER UNIT HAVING RECURSIVE OPTICAL SYSTEM

BACKGROUND OF THE INVENTION (1) Field of the invention

The present invention generally relates to an optical scanner Unit having a recursive optical system, and more particularly to an optical scanner unit having a recursive optical system which can be applied to an image reading apparatus.

(2) Description of related art

A first example of a conventional optical scanner unit is shown in FIG. 1. Referring to FIG. 1, a document 2 is put on a reading surface 1a of a main body 1 of this optical scanner unit. A light source 3 mounted in the main body 1 irradiates the surface of the document 2. A light reflected by the surface of the document 2 passes through an optical path extending to a CCD sensor 6. Mirrors 4 and a focusing lens 5 are arranged in the optical path, so that the light successively reflected by the mirrors 4 is focused by the focusing lens 5 on the CCD sensor 6. The light source 3, the mirrors 4 and focusing lens 5 are moved in a predetermined direction parallel to the reading surface 1a of the main body 1 so that the document 2 is optically scanned.

A second example of the conventional optical scanner unit is shown in FIG. 2. Referring to FIG. 2, a focusing lens 9 and a CCD sensor 10 are mounted in a region separated from a recording surface 8 on which a document 7 is put. The document 7 is irradiated by the light source 3 and optically scanned by moving a mirror (not shown in FIG. 2).

A third example of the conventional optical scanner unit is shown in FIG. 3. In the third example, a laser beam scans a document. Referring to FIG. 3, a laser beam emitted from a laser unit 11 is shaped into a predetermined form by a beam expander 12. The laser beam passing through the beam expander 12 is reflected by a polygonal mirror 13 which is rotated at a constant speed, so that the reflected laser beam is swung within a predetermined angle range. The swung laser beam is projected onto a surface of a document 15 via an f-θ lens 14, so that the laser beam scans the document 15 at a constant speed in a predetermined direction. While the laser beam is scanning the document 15, a light scattered on the document 15 is incident on an optical sensor 16. Image information is obtained based on output signals from the optical sensor 16.

In the third example of the conventional optical scanner unit, as a size of the laser beam spot can be small, the image formed on the document can be accurately read.

However, in an optical scanner unit using the CCD sensor, such as those of the first example shown in FIG. 1 and the second example shown in FIG. 2, as the light is strongly focused on the CCD sensor, a numerical aperture (N.A) in the optical system is large. Thus, a focal depth in the optical scanner unit is shallow. When a document having a part far from the reading surface on which it is set, such as a book, is scanned, a loose image corresponding to the part of the document far from the reading surface is obtained. In addition, as a thin light beam is not used, this type of the optical scanner is not suitable for accurately reading the document.

In the third example of the optical scanner unit, as a thin laser beam scans the document, the focal depth is large. In addition, as the laser beam can be focused so as to have a small spot size, fine images can be accurately read. However, a mechanism for moving the document scanned by the laser beam is needed, so that the size of the optical scanner unit is enlarged.

In addition, in the conventional optical scanner unit, a wavelength of the light emitted from the light source is constant. In a case where an image formed on the document has a color corresponding to approximately the same wavelength as the light, the image can hardly be read.

SUMMARY OF THE INVENTION

Accordingly, a general object of the present invention is to provide a novel and useful optical scanner unit in which the disadvantages of the aforementioned prior art are eliminated.

A more specific object of the present invention is to provide an optical scanner unit capable of accurately reading a document.

Another object of the present invention is to provide an optical scanner unit capable of being miniaturized.

The above objects of the present invention are achieved by an optical scanner unit for scanning a document comprising: light source means for emitting a light beam used for scanning the document; an optical system in which the light beam emitted from the light source means travels to the document and a reflection light beam obtained by reflection of the light beam on the document can turn back through the optical system, the optical system having scanning means for moving the light beam which passes through the optical system so that a two dimensional scanning of the document is carried out by the light beam; and detection means, coupled to the optical system, for detecting the reflection light beam turning back through the optical system; wherein an image formed on the document is read based on results obtained by the detection means.

According to the present invention, the light beam scans the document and the reflection light turning back through the optical system is detected by the optical sensor. Thus, the document can be minutely read, and the optical scanner unit can be miniaturized.

Another object of the present invention is to provide an optical scanner unit in which an image having various colors can be accurately read.

The above objects of the present invention are achieved by an optical scanner unit for scanning a document comprising: light source means for emitting a plurality of light beams whose wavelengths differ from each other, the plurality of light beams being used for scanning the document; an optical system in which the plurality of light beams emitted from the light source means travel to the document, the optical system having scanning means for moving the plurality of light beams which passes through the optical system so that a two dimensional scanning of the document is carried out by the plurality of light beams; and detection means, coupled to the optical system, for detecting reflection light beams obtained by reflection of the plurality of light beams; wherein images formed on the document is read based on results obtained by the detection means.

According to the present invention, as the document is scanned by a plurality of light beams whose wavelengths differ from each other, an image having various colors can be accurately read.

Additional objects, features and advantages of the present invention will become apparent from the following detailed description when read in conjunction with the accompanying drawings.

DESCRIPTION OF THE PREFERRED EMBODIMENT

A description will now be given of an optical scanner unit according to a first embodiment of the present invention with reference to FIGS. 4 and 5.

Figure 1:
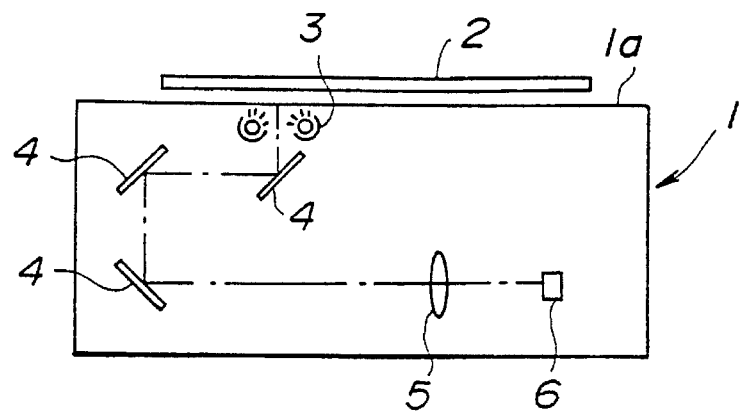
FIG. 1 is a diagram illustrating a first example of a conventional optical scanner unit.
Figure 2:
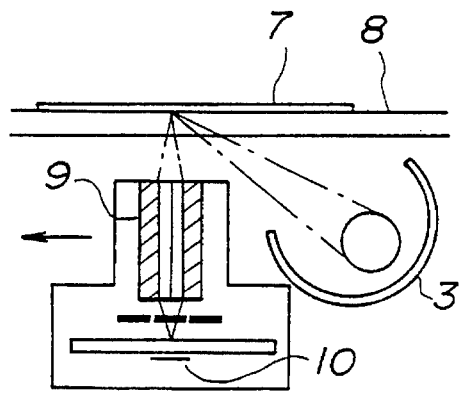
FIG. 2 is a diagram illustrating a second example of a conventional optical scanner unit.
Figure 3:
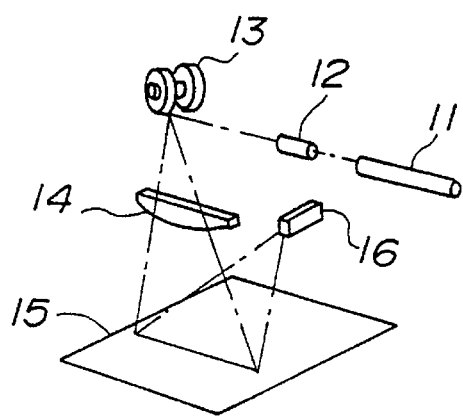
FIG. 3 is a diagram illustrating a third example of a conventional optical scanner unit.
Figure 4:
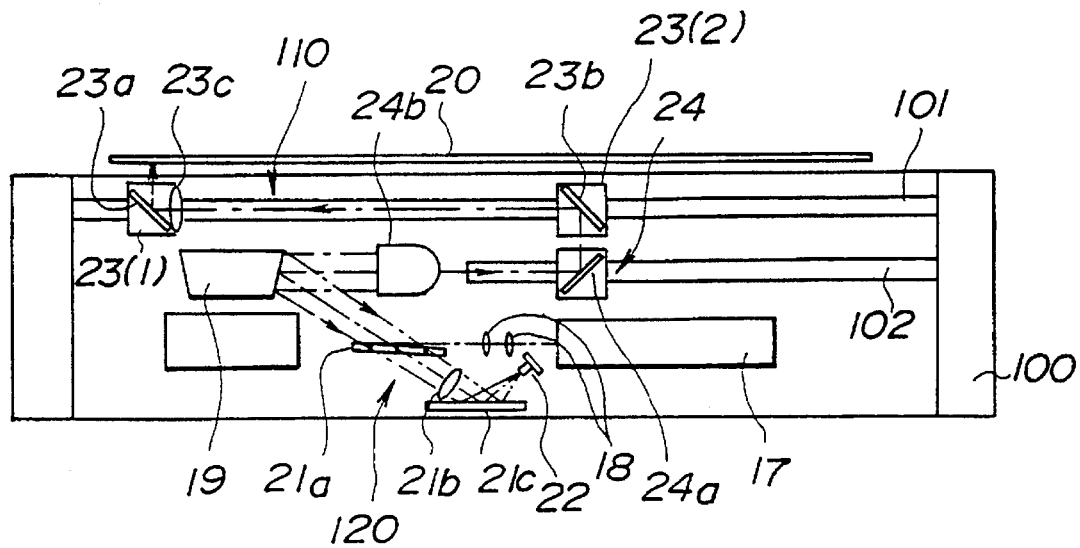
FIG. 4 is a diagram illustrating an optical scanner unit according to a first embodiment of the present invention.
Figure 5:
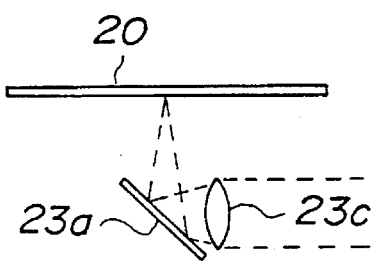
FIG. 5 is a detailed diagram illustrating the arrangement of a reflection mirror and a cylindrical lens shown in FIG. 4.

Referring to FIG. 4, a laser unit 17, including a semiconductor laser element as a light source, is mounted in a main body 100 of an optical scanner unit. A laser beam emitted from the laser unit 17 passes through a beam shaping prism 18 so as to be shaped into a predetermined form. The laser beam passing through the beam shaping prism 18 is reflected by a mirror 21a having an aperture and is incident to a polygonal mirror 19 rotated at a constant speed. The laser beam reflected by the polygonal mirror 19 is swung within a predetermined angle range in synchronism with the rotation of the polygonal mirror 19. The laser beam reflected by the polygonal mirror 19 passes through a first optical path 110 and is projected onto a document 20 put on a reading surface of the main body 100. An f-θ lens 24b, first, second and third reflection mirrors 23a, 23b and 24a, and a cylindrical lens 23c are arranged in the first optical path 110. The first optical path 110 is provided with the reflection mirrors 23a, 23b and 24a so as to be turned by 90° at a position of each of the first, second and third reflection mirrors 23a, 23b and 24a. When the laser beam is swung in synchronism with the rotation of the polygonal mirror 19, a laser spot on the document 20 scans in a direction parallel to the width of the main body 100 (a main scanning). The laser beam is focused on the document 20 by the cylindrical lens 23c, as shown in FIG. 5. The cylindrical lens 23c has a function for correcting an aberration in an optical system.

A light beam scattered by the document 20 turns back through the first optical path 110 extending from the first reflection mirror 23a to the f-θ lens 24b and is incident to the polygonal mirror 19 again. The light beam reflected by the polygonal mirror 19 passes through a second optical path 120 and is projected onto the surface of an optical sensor 22. The mirror 21a, a focusing lens 21b and a reflection mirror 21c are arranged in the second optical path 120, so that the light beam passing through the aperture of the mirror 21a is focused, by the focusing lens 21b and the reflection mirror 21c, on the surface of the optical sensor 22.

The first reflection mirror 23a and the cylindrical lens 23c are mounted in a first carriage 23(1), the second reflection mirror 23b is mounted in a second carriage 23(2), and a third reflection mirror 24a is mounted in the third carriage 24. The first carriage 23(1) and the second carriage 23(2) are slidably provided on a guide bar 101, which is mounted in the main body 100 so as to be parallel to the reading surface, in a state where they are separated from each other by a predetermined distance. The third carriage 24 is slidably provided on a guide bar 102 parallel to the guide bar 101. When the document 20 is scanned, the first carriage 23(1) slides on the guide bar 101 at a speed V, and the second and third carriages 23(2) and 24 respectively slide on the guide bars 101 and 102 at a speed half that (V/2) of the speed V. The carriages 23(1), 23(2) and 24 slide in the same direction. As a result, even if the carriages 23(1), 23(2) and 24 slide on the guide bars 101 and 102, the length of the first optical path 110 is maintained at a constant value so that the light beam is usually focused on the optical sensor 22 accurately. When the carriages 23(1), 23(2) and 24 slide on the guide bars 101 and 102, the laser beam scans the document 20 in a direction perpendicular to a direction of the main scanning (a sub scanning).

Due to the rotation of the polygonal mirror 19 and the sliding of the carriages 23 (1), 23(2) and 24, two dimensional scanning of the document 20 is carried out.

In the optical scanner unit shown in FIG. 4, the laser beam incident to the second optical path 120 passes through the second optical path 120 and the first optical path 110 and reaches the document 20. Then the light beam, reflected by the document 20, turns back through the first optical path 110 and the second optical path 120 (the same optical paths through which the laser beam passes) and reaches the optical sensor 22. That is, optical elements in the first and second optical paths 110 and 120 form a recursive optical system.

In a case where the recursive optical system is used in the optical scanner unit, as has been described above, only the light beam passing through the recursive optical system can reach the optical sensor, and a signal to noise ratio (SN) of signals obtained by the optical sensor 22 is improved. In addition, in a case where one or a plurality of optical elements, such as the cylindrical lens 23c, provided in the first and second optical paths 101 and 102 have anamorphic characteristics, the optical path can be thinner in a predetermined direction without decreasing the amount of light in the optical path. Thus, the size of the optical scanner unit can be miniaturized.

A description will now be given of a modification of the first embodiment described above, with reference to FIG. 6.

Figure 6:
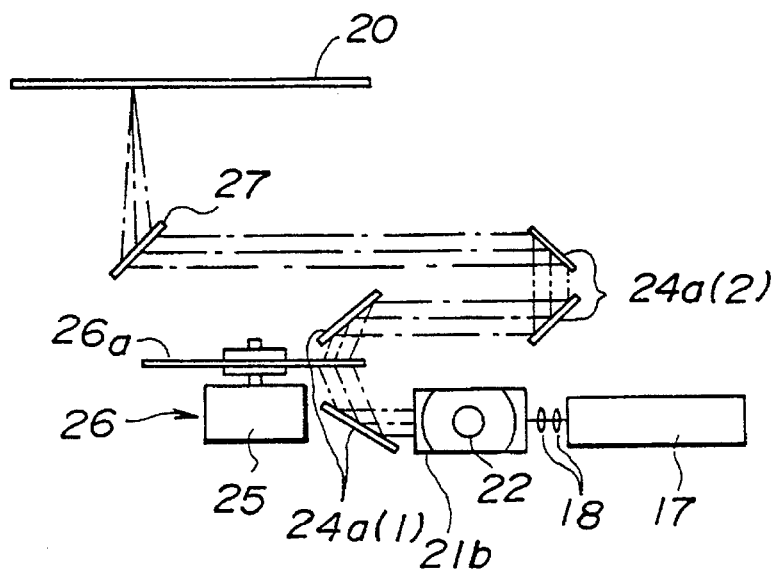
FIG. 6 is a diagram illustrating an optical scanner unit according to a modification of the first embodiment of the present invention.

Referring to FIG. 6, a holographic scanner 26 is substituted for the polygonal mirror 19 shown in FIG. 4. The holographic scanner 26 has a holographic disk 26a and a motor 25 for rotating the holographic disk 26a. A laser beam emitted from the laser unit 17 travels in an optical path extending from the laser beam unit 17 to the surface of the document 20. In this optical path, the beam shaping prism 18, the focusing lens 21b, the hologram scanner 26, reflection mirrors 24a(1) and 24a(2) and a hologram plate 27 are arranged. The hologram plate 27 and the reflection mirrors 24a(1) and 24a(2) move in the same manner as the first reflection mirror 23a, the cylindrical lens 23c and the second and third reflection mirrors 23b and 24 shown in FIG. 4. Due to the holographic scanner 26 having a function for correcting an aberration of an optical system, the f-θ lens 24b shown in FIG. 4 can be omitted. The hologram disk 26a can also have a function for focusing a light beam. The hologram plate 27 has a function for correcting an aberration of an optical system and a function for focusing a light beam, based on a diffraction grating thereof. When the light beam passes through the hologram plate 27, the light beam is turned by 90° as shown in FIG. 6. Thus, the reflected mirror 23a shown in FIGS. 4 and 5 can be omitted.

A first hologram used for emitting a light beam and a second hologram used as a condenser can be formed on the hologram plate 27. In this case, a light beam passing through the first hologram and a light beam passing through the second hologram can be independently corrected.

The hologram plate 27 and the hologram disk 26a of the holographic scanner 26 can be formed of resin or another such material in accordance with a known process.

An optical system including the hologram plate 27 and another scanner, such as a polygonal mirror or a galvanomirror, can be applied to the optical scanner unit.

A description will now be given of a second embodiment of the present invention with reference to FIG. 7.

Figure 7:
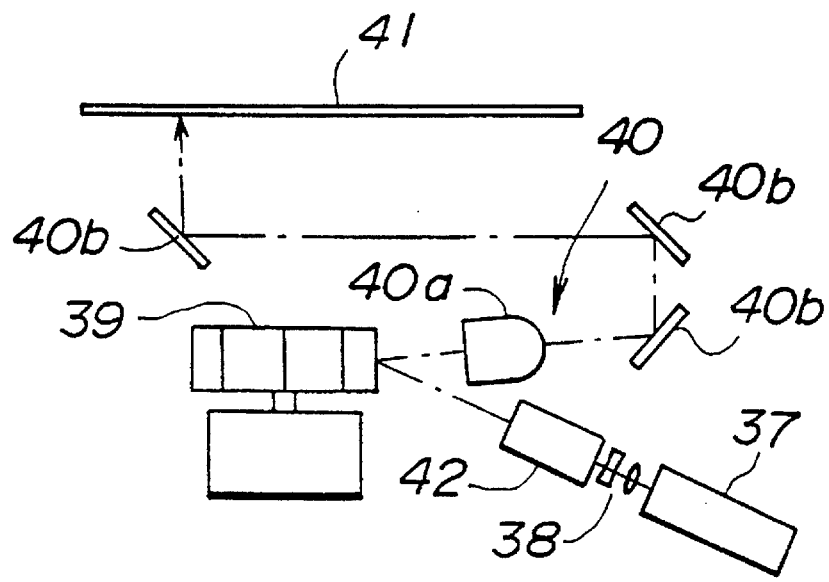
FIG. 7 is a diagram illustrating an optical scanner unit according to a second embodiment of the present invention.

Referring to FIG. 7, a laser beam emitted from a laser unit 37 passes through a beam shaping lens 38 so as to be shaped into a predetermined form. The laser beam shaped by the beam shaping lens 38 travels in a wavelength conversion element 42 and reaches a polygonal mirror 39. The polygonal mirror 39 is rotated at predetermined speed, so that the laser beam, reflected by the polygonal mirror 39, is swung within a predetermined angle range. The laser beam reflected by the polygonal mirror 39 travels in an optical system 40, which includes an f-θ lens 40a and reflection mirrors 40b, and reaches the document 41. The light beam, reflected by the document 41, turns back through the same optical path and reaches an optical sensor (not shown). That is, optical elements in the optical path form a recursive optical system. The reflection mirrors 40b move in the same manner as those shown in FIG. 5. Due to the swinging of the laser beam in synchronism with the rotation of the polygonal mirror 39 and the movement of the reflection mirrors 40b, the second dimensional scanning of the document is carried out by the laser beam.

The wavelength conversion element 42 is formed, for example, of a nonlinear optical element, such as an SHG (Second Harmonic Generator). Thus, when a laser beam having a wavelength $\lambda$ is input to the wavelength conversion element 42, a first beam component having the same wavelength as the original input laser beam and a second beam component which is a higher harmonics component having a wavelength $\lambda/2$ are output from the wavelength conversion element 42. The optical sensor has a high level of sensitiveness at both the wavelengths $\lambda$ and $\lambda/2$.

In this optical scanner unit, two types of laser beam, the first beam component having the wavelength $\lambda$ and the second beam component having the wavelength $\lambda/2$, scan the document 41 simultaneously. As the wavelength ($\lambda$) of the first beam component and the wavelength ($\lambda/2$) of the second beam component greatly differ from each other, even if the document has various color images including color images corresponding to wavelengths $\lambda$ and $\lambda/2$, the color images on the document 41 can be accurately read by at least either the first beam component or the second beam component.

In the second embodiment, two beams whose wavelengths greatly differ from each other are generated by the wavelength conversion element 42 (SHG). That is, the two beams can be obtained by one light source, so that the optical scanner unit can be miniaturized and the cost thereof can be decreased.

Figure 8:
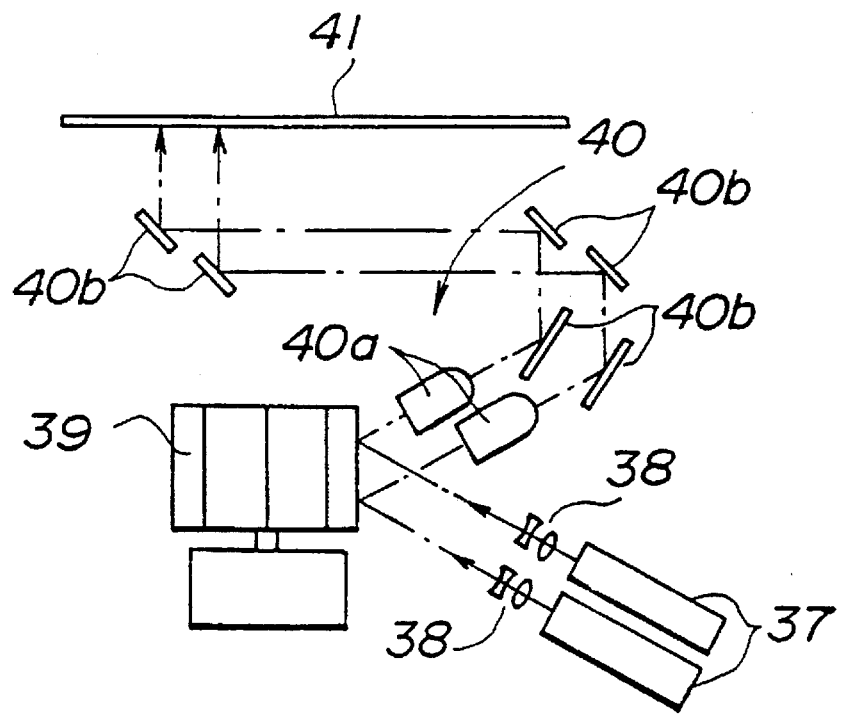
FIG. 8 is a diagram illustrating an optical scanner unit according to a first modification of the second embodiment of the present invention.

A description will now be given of a first modification of the second embodiment with reference to FIG. 8. In FIG. 8, those parts which are the same as those shown in FIG. 7 are given the same reference numbers.

In the first modification, two light sources are substituted for the wavelength conversion element 42 shown in FIG. 7. That is, referring to FIG. 8, two laser units 37 are provided in the optical scanner unit. Wave lengths of the laser beams emitted from the laser unit 37 greatly differ from each other. A pair of the optical systems 40 corresponding to the respective laser units 37 is provided in the optical scanner unit. The laser beam emitted from each of the laser units 37 travels in an optical path, in which the beam shaping lens 38, the polygonal mirror 39, the f-θ lens 40a, and the reflected mirrors 40b are provided, so as to reach the document 41.

In the optical scanner unit according to the first modification of the second embodiment, the two laser units 37 can be independently controlled. Thus, the power of each of laser beams emitted from the laser units 37 can be easily optimized so that the document 41 having various color images can be read.

Figure 9:
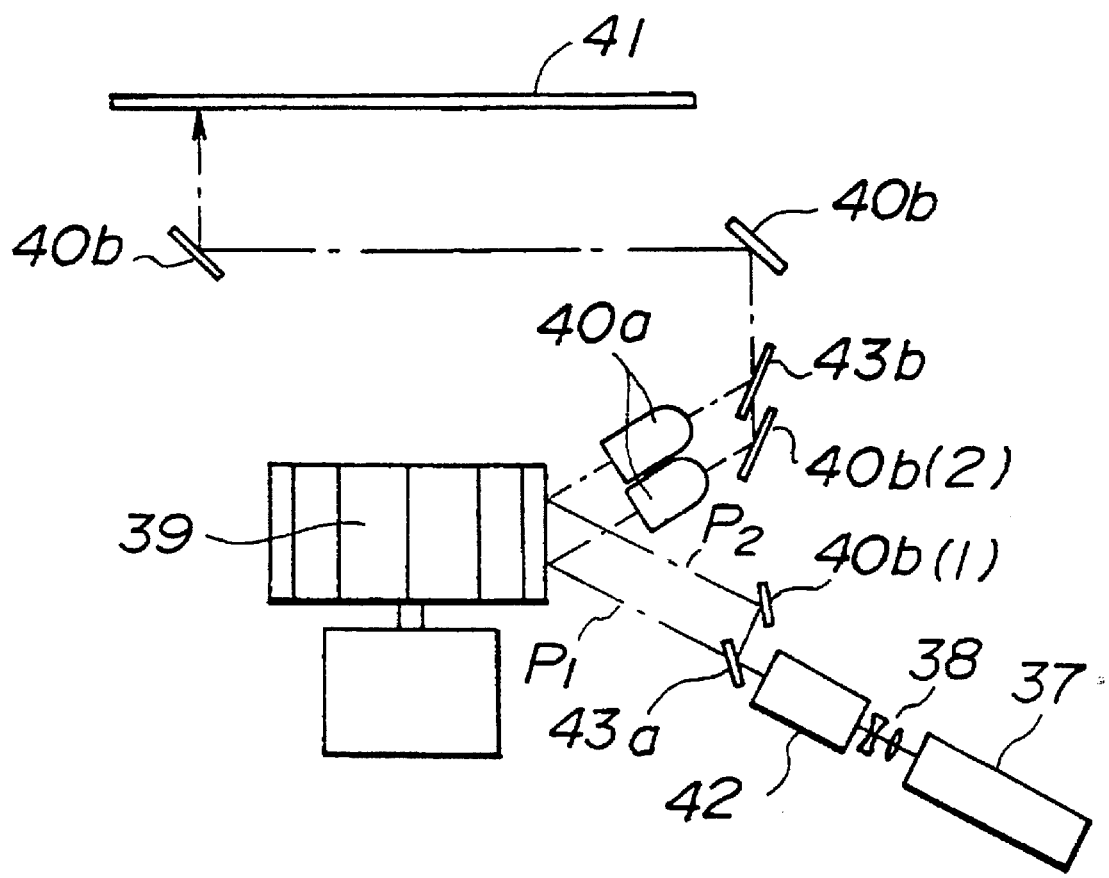
FIG. 9 is a diagram illustrating an optical scanner unit according to a second modification of the second embodiment of the present invention.

A description will now be given of a second modification of the second embodiment of the present invention with reference to FIG. 9. In FIG. 9, those parts which are the same as those shown in FIGS. 7 and 8 are given the same reference numbers.

Referring to FIG. 9, a laser beam emitted from a laser unit 37 passes through a beam shaping lens 38 and is incident to a wavelength conversion element 42. The wavelength conversion element 42, formed of a nonlinear optical element (e.g. SHG), outputs a beam formed of a first beam component having a first wavelength equal to the wavelength λ) of the original incident laser beam and a second beam component having a second wavelength (e.g. λ/2) less than the first wavelength. The first and second beam components output from the wavelength conversion element 42 are incident to a multi-layer film filter 43a. The multi-layer film filter 43a is transparent as regards a light having a wavelength within a predetermined range including the first wave length (λ). The multi-layer film filter 43a reflects a light having a wavelength within a predetermined range including the second wavelength (λ/2). Thus, when the first and second beam components are incident to the multi-layer film filter 43a, the first beam component passes through the multi-layer film filter 43a so as to travel in a first path $P_1$, and the second beam component is reflected by the multi-layer film filter 43a so as to travel in a second path $P_2$. That is, the laser beam output from the wavelength conversion element 42 is divided into the first and second beam components by the multi-layer film filter 43a. The first beam component in the first optical path $P_1$ travels to a multi-layer film filter 43b via the polygonal mirror 39, one of the f-θ lenses 40a and a reflection mirror 40b(2). The second beam component in the second optical path $P_2$ travels to the multi-layer film filter 43b via a reflection mirror 40b(1), the polygonal mirror 39 and the other one of the f-θ lenses 40a. The first beam component passes through the multi-layer film filter 43b and the second beam component is reflected by the multi-layer film filter 43b, so that the first and second beam components are mixed. The laser beam obtained by compounding the first and second beam components travels to the document 41 via the reflection mirrors 40b. The light beam, reflected by the document 41, turns back through the same optical path. That is, the reflected light beam is divided, by the multi-layer film filter 43b, into the first beam component traveling in the first optical path $P_1$ and the second beam component traveling in the second optical path $P_2$. Thus, optical elements in the optical path in this optical scanner unit form a recursive optical system.

In the optical scanner unit according to the above second modification shown in FIG. 9, an optical system in the first optical path and an optical system in the second optical path can be independently designed so that chromatic aberration is corrected. Thus, image information corresponding to the first beam component and image information corresponding to the second beam component can be easily superposed.

In a case where the wavelength conversion element divides the light beam emitted from one light source into two beam components, the first beam component and the second beam component, as shown in FIGS. 7 and 9, it is preferable that the first beam component be detected by the optical sensor different from that which detects the second beam component. Each of the optical sensors has a high level of sensitivity in a wave length range including that of a corresponding one of the first and second beam components. In this case, after the light beam is reflected by the document 41, the reflected light beam is separated into the first beam component traveling in a path in which an optical sensor having a hight level of sensitivity corresponding to the first beam component is provided, and the second beam component traveling in a path in which an optical sensor having a high level of sensitivity corresponding to the second beam component is provided.

A description will now be given of a third embodiment of the present invention with reference to FIGS. 10, 11A and 11B.

Figure 10:
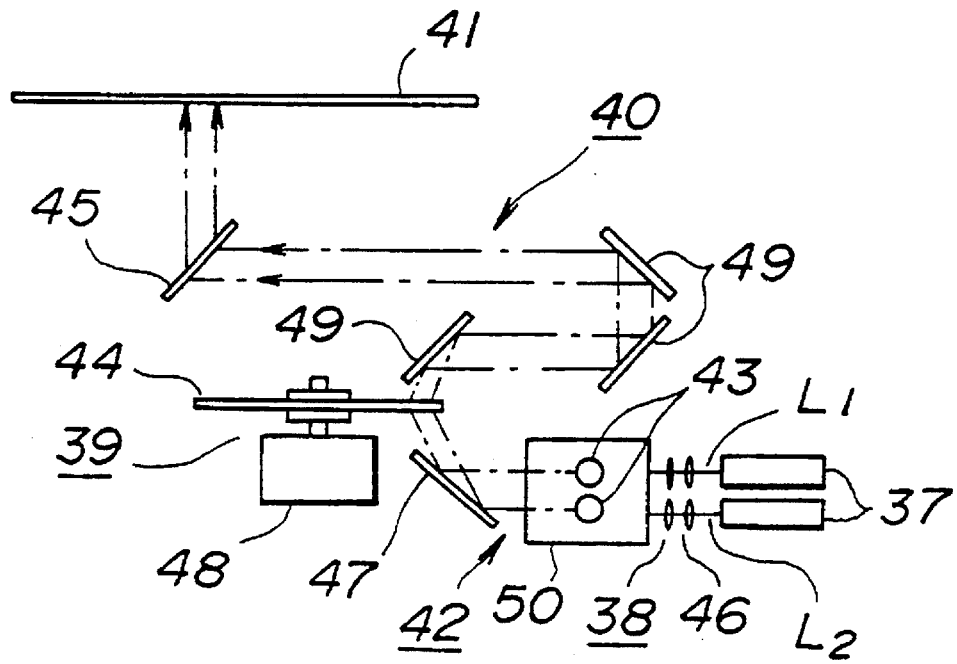
FIG. 10 is a diagram illustrating an optical scanner unit according to a third embodiment of the present invention.
Figures 11A, 11B:
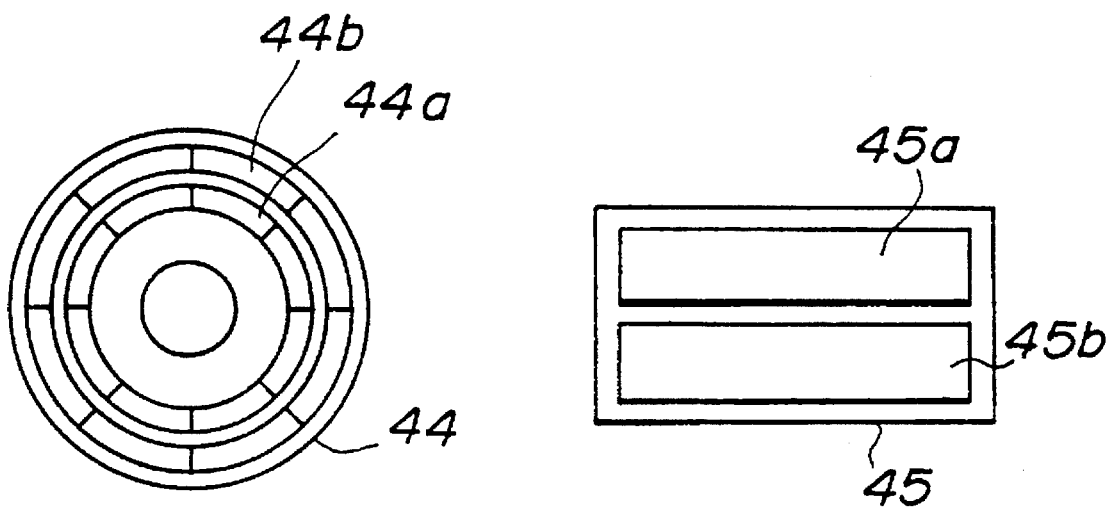
FIG. 11A is a detailed diagram illustrating a hologram disk shown in FIG. 10.
FIG. 11B is a detailed diagram illustrating a holographic plate shown in FIG. 10.

Referring to FIG. 10, this optical scanner unit has two laser units 37. One of the laser units 37 emits a first laser beam L1 having a first wavelength, and the other laser unit 37 emits a second laser beam L2 having a second wavelength different from the first wavelength. The first and second laser beams emitted from the respective laser units 37 pass through collimator lenses 46 and an aperture of a mirror 50, and reach a reflection mirror 47. The collimator lenses 46 and the reflection mirror 47 function as a beam shaping optical system 38. This optical scanner also has the holographic scanner 39. The holographic scanner 39 has a hologram disk 44 and a motor 48 for rotating the hologram disk 44 in a predetermined direction and at a predetermined speed. The first and second laser beams L1 and L2 reflected by the reflection mirror 47 pass through the hologram disk 44. The hologram disk 44 has first holograms 4a having an optical characteristics corresponding to the first laser beam L1, and second holograms 44b having an optical characteristics corresponding to the second laser beam L2, as shown in FIG. 11A. The first holograms 44a and the second holograms 44b are concentrically arranged on the hologram disk 44. The first laser beam L1 passes through each of the first hologram 44a, and the second laser beam L2 passes through each of the second hologram 44b. The first and second laser beams L1 and L2, after passing through the hologram disk 44, travel in an optical path 40 in which reflection mirrors 49 and a hologram plate 45 are provided. The optical path 40 is provided with the reflection mirrors 49 so as to be turned by 90° at a position of each of the reflection mirrors 49. The first and second laser beams L1 and L2, after passing through the hologram plate 45, are then focused on the surface of the document 41, so that the first and second laser beams L1 and L2 scan the document in synchronism with the rotation of the hologram disk 44. The hologram plate 45 has a first hologram 44a and a second hologram 45b, as shown in FIG. 11B. The first laser beam L1 passes through the first hologram 45a, and the second laser beam L2 passes through the second hologram 45b. The first hologram 45a has optical characteristics corresponding to a wave length of the first laser beam L1, such as a f-θ characteristic and an aberration correcting characteristic. The second hologram 45b has optical characteristics corresponding to a wavelength of the second laser beam L2.

The hologram plate 45 and the reflection mirrors 49 move in the same manner as the mirrors 23a, 23b, and 24a shown in FIG. 4, so that a two dimensional scanning of the document can be carried out.

Two light beams, reflected by the document 41, turn back through the same optical paths as those through which the laser beams travel to the document 41. That is, the optical paths in this optical scanner unit form a recursive optical system. The two light beams turned back through in the optical paths are reflected by the mirror 50 and respectively detected by optical sensors 43. Each of the optical sensors 43 has a high level of sensitivity in a wavelength range including that of a corresponding one of the first and second laser beams L1 and L2.

In the third embodiment described above, the two laser beams having wavelengths different from each other scan the document 41. Thus, even if there is a case where various colored images are formed on the document 41, the colored images can be accurately read.

In addition, the f-θ characteristic corresponding to a wavelength of each of the first and second laser beams can be obtained by controlling a spatial frequency of each of the holograms 44a,44b, 45a and 45b. Thus, as the f-θ lens, which is expensive, can be omitted from the optical scanner unit, the cost of the optical scanner unit can be decreased. The holograms can be easily reproduced by use of plates formed of resin, so that the hologram disk 44 and the hologram plate 45 can be mass produced.

A description will now be given of a first modification of the third embodiment of the present invention with reference to FIG. 12.

In the third embodiment described above with reference to FIG. 10, the first beam L1 and the second beam L2 scan the document on image lines different from each other. Thus, when image signals obtained by the sensors 43 are composed, one of the image signals must be corrected in order to compose the images on the same line. On the other hand, in the first modification of the third embodiment, it is not necessary to correct one of the image signals to compose the images on the same line.

Figure 12:
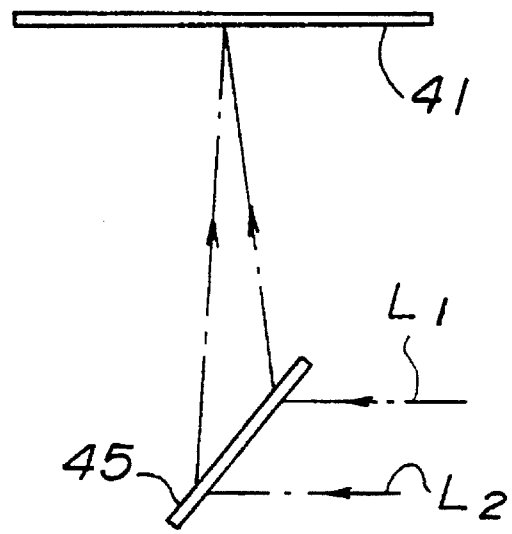
FIG. 12 is a diagram illustrating a holographic plate according to a first modification of the third embodiment of the present invention.

That is, the optical characteristics of the hologram plate 45 (the first and second holograms 45a and 45b) are controlled so that the first beam L1 passing through the first hologram 45a and the second beam L2 passing through the second hologram 45b are simultaneously focused on the same point on a line of the document 41, as shown in FIG. 12. In this case, as the first beam L1 and the second beam L2 simultaneously scan the document at the same point on the line thereof, it is not necessary to correct one of the image signals output from the optical sensors 43 in order to compose the image signals on the same line. Thus, a control system of this optical scanner unit can be simplified.

Figure 13:
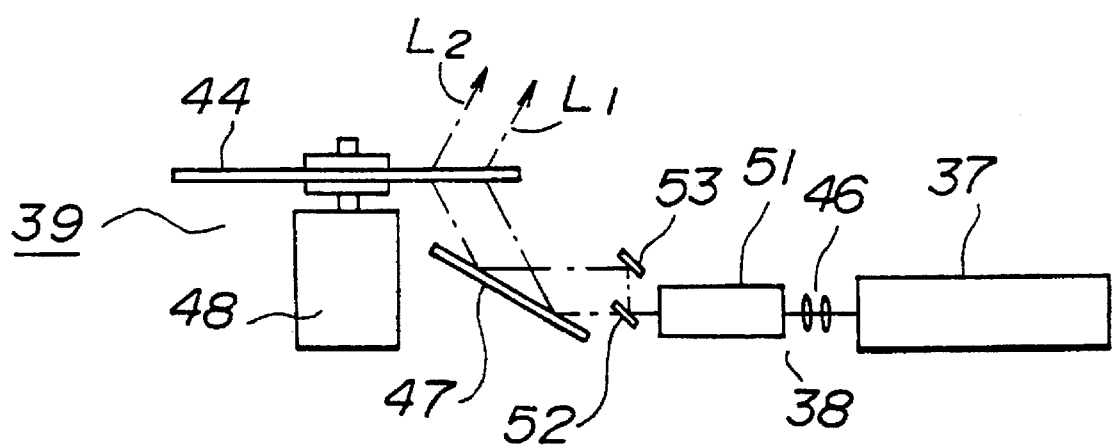
FIG. 13 is a diagram illustrating an optical scanner according to a second modification of the third embodiment of the present invention.

A description will now be given of a second modification of the third embodiment of the present invention with reference to FIG. 13. In FIG. 13, those parts which are the same as those shown in FIG. 10 are given the same reference numbers.

Referring to FIG. 13, a wavelength conversion element 51, a filter 52 and a reflection mirror 53, which form the beam shaping optical system 38, are provided between the collimator lens 46 and the reflection mirror 47. The wavelength conversion element 51 is formed of a nonlinear optical element, such as an SHG, so that the laser beam passing through the wavelength conversion element 51 is divided into the first beam component L1 and the second beam component L2. The first beam component L1 has a wavelength ($\lambda$) equal to that of the original laser beam incident to the wavelength conversion element 51. The second beam component L2 has a wavelength ($\lambda/2$) which is half that of the wavelength of the first beam component L1. The filter 52 is transparent with respect to the first beam component L1. The second beam component L2 is reflected by the filter 52. The first beam component L1, after passing through the filter 52, is reflected by the reflection mirror 47, and the second beam component L2 reflected by the filter 52 is further reflected by the reflection mirrors 53 and 47. Then the first and second beam components L1 and L2 reflected by the reflection mirror 47 travel to the document via the hologram disk 44 in the same manner as that shown in FIG. 10.

In the second modification of the third embodiment, it is not necessary to provide two light sources (the laser units) in the optical scanner unit. Thus, the optical scanner unit can be miniaturized.

A description will now be given of a fourth embodiment of the present invention with reference to FIG. 14.

Figure 14:
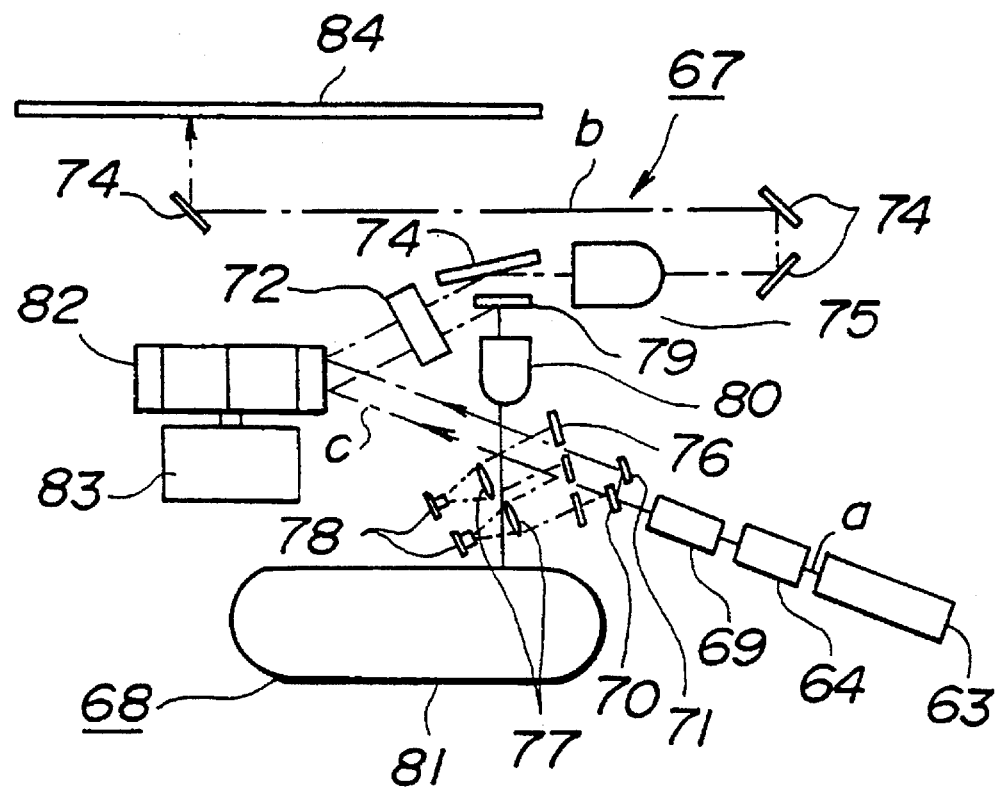
FIG. 14 is a diagram illustrating an optical scanner unit according to a fourth embodiment of the present invention.

Referring to FIG. 14, a laser beam (a) emitted from a laser unit 63 passes through a beam shaping optical system 64 so as to be shaped into a predetermined form. The laser beam (a) passing through the beam shaping optical system 64 is incident on a nonlinear optical element 69 such as an SHG. When the laser beam (a) is input to the nonlinear optical element 69, a first beam component (c) having the same wavelength as the input laser beam (a) and a second beam component (b) having a wavelength less than that of the input laser beam (a) are output from the nonlinear optical element 69. The first beam component (c) passes through a separation filter 70 and the second component beam (b) is reflected by the separation filter 70, so that the first and second beam components (c) and (b) are separated from each other. In the fourth embodiment, the first beam component (c) is used for writing information and the second beam component (b) is used for reading image information on a document. The first beam component (c) travels to a shutter 72 via a mirror 76 having apertures and a polygonal mirror 82 rotated by a motor 83 at a predetermined speed. The second beam component (b) travels to the shutter 72 via a reflection mirror 71, the mirror 76 and a polygonal mirror 82. When an image writing process is carried out, the shutter 72 intercepts the second beam component (b) so that the first beam component (c) passes through the shutter 72. When an image reading process is carried out, the shutter 72 intercepts the first beam component (c) so that the second beam (b) passes through the shutter 72.

The second beam component (b) passing through the shutter 72 is reflected by a reflection mirror 74 and incident on an f-θ lens 75 having anamorphic characteristics. The second beam component (b) then travels in an optical path 67 and reaches the document 84. The optical path 67 is provided with reflection mirrors 74 so as to be turned by 90° at a position of each of the reflection mirrors 74. The reflection mirrors 74 can be moved in the same manner as the reflection mirrors 23a, 23b and 24 shown in FIG. 4. A light beam reflected by the document 84 turns back through the same optical path as that in which the second beam component travels so as to reach the polygonal mirror 82, and then the light beam, reflected by the polygonal mirror 82, is also reflected by the mirror 67 and detected by optical sensors 78. That is, optical elements in the optical path through which the second beam component (b) travels form a recursive optical system.

The first beam component (c) passing through the shutter 72 is reflected by a mirror 79 and incident on an f-θ lens 80. The first beam component (c), after passing through the f-θ lens 80, travels to an image writing system 68. In the image writing system 68, for example, an electrophotographic process including an optical writing step of forming an latent image on a photosensitive member is performed.

In a case where the image reading process is carried out, the shutter 72 is controlled so as to intercept the first beam component (c). Then, the second beam component (b) scans the document 84 in synchronism with the rotation of the polygonal mirror 82. The reflected light beam corresponding to the image on the document 84 travels in the recursive optical system to the optical sensors 78. As a result, the image information corresponds to image signals output from the optical sensors 78. On the other hand, when the image writing process is selected, the shutter 72 is controlled so as to intercept the second beam component (b). Then the laser beam (a) emitted from the laser unit 63 is modulated in accordance with image information supplied from an external controller (not shown). Thus, the modulated first beam component (a) scans the photosensitive member in the optical writing system in synchronism with the rotation of the polygonal mirror 82.

According to the fourth embodiment of the present invention, one scanning optical system including the laser unit 63, the polygonal mirror 82 and the like is used for both the image reading process and the image writing process. Thus, down sizing of the optical scanner unit can be performed.

In the fourth embodiment, the laser unit 63 has a semiconductor laser element for emitting a red colored laser beam (having a large wavelength). In this case, the first beam component (c) is also the red colored laser beam and the second beam component (b) is also a green colored laser beam having a wavelength less than that of the red colored laser beam. From the viewpoint of spectral reflectance of dyes, various colored images can be generally read by use of a green colored light beam. Thus, in the fourth embodiment, as the second beam component (b) used for the image reading process is also the green colored laser beam, the various colored images formed on the document 84 can be read.

Figure 15:
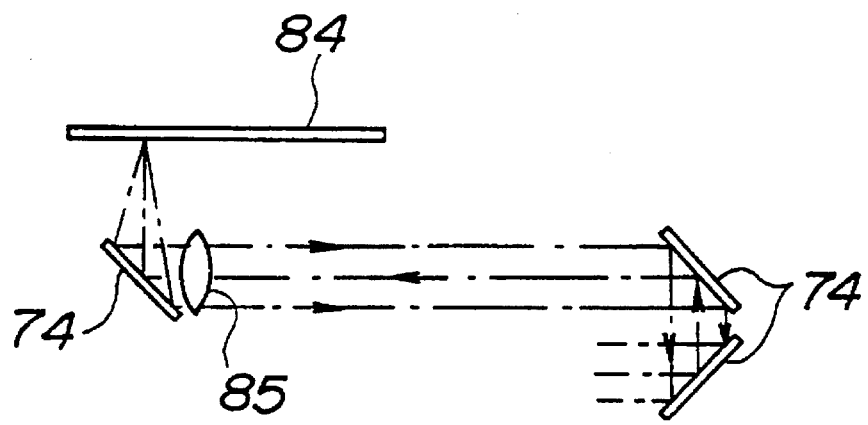
FIG. 15 is a diagram illustrating an optical system provided in the optical scanner unit according to a modification of the fourth embodiment of the present invention.

The optical path 67 can be provided with a cylindrical lens 85, as shown in FIG. 15, arranged so that the second light beam is focused on the document 84.

Figure 16:
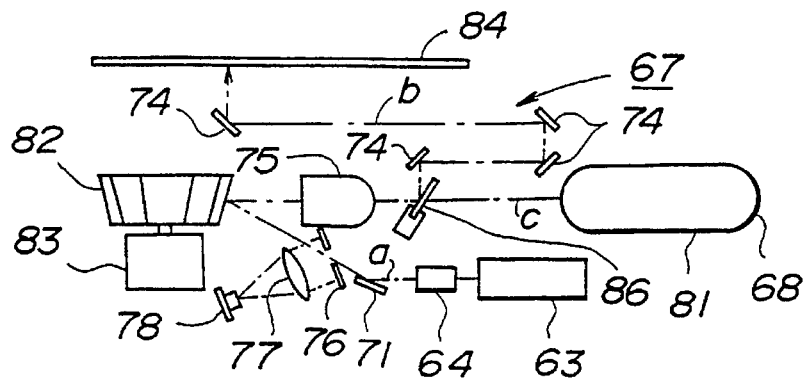
FIG. 16 is a diagram illustrating an optical scanner unit according to a fifth embodiment of the present invention.
Figures 17A, 17B:
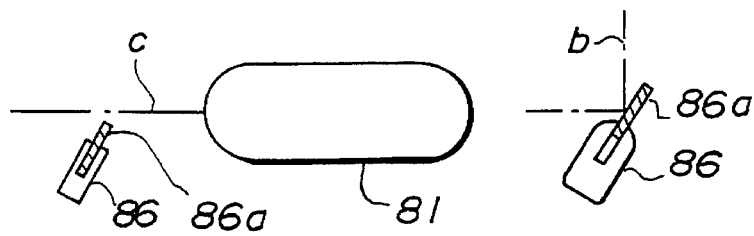
FIGS. 17A and 17B are diagrams illustrating operations of a mirror shutter shown in FIG. 16.

A description will now be given of a fifth embodiment of the present invention with reference to FIGS. 16, 17A and 17B. In FIGS. 16, 17A and 17B, those parts which are the same as those shown in FIG. 14 are given the same reference numbers.

Referring to FIG. 16, a laser beam (a) emitted from the laser unit 63 travels to a mirror shutter 86 via the beam shaping optical system 64, the reflection mirror 71, the mirror 76 having an aperture, the polygonal mirror 82 and the f-θ lens 75. An optical path of the laser beam (a) is switched by the mirror shutter 86. In a case where the image writing process is carried out, a reflection mirror 86a is slid into the mirror shutter 86 as shown in FIG. 17A, so that the laser beam (a) travels as a writing light beam (c) to the optical writing system 81. On the other hand, when the reflection mirror 86a projects from the mirror shutter 86 as shown in FIG. 17B, the laser beam (a) is reflected by the reflection mirror 86a and travels, as a reading light beam (b), in the optical path 67 to the document 84.

According to the fifth embodiment, as the optical path of the laser beam (a) is switched by the mirror shutter 86 to either one extending to the document 84 or one extending to the optical writing system 81, the structure of the optical scanner unit capable of both writing and reading the image can be simplified.

Figure 18:
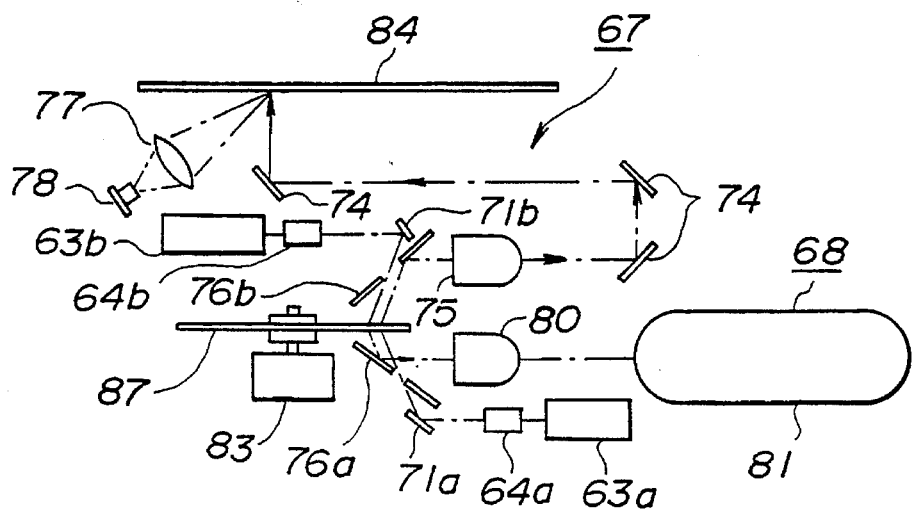
FIG. 18 is a diagram illustrating an optical scanner unit according to a sixth embodiment of the present invention.

A description will now be given of a sixth embodiment of the present invention with reference to FIG. 18. In FIG. 18, those parts which are the same as those shown in FIGS. 14 and 16 are given the same reference numbers. In the fifth embodiment, two laser units and a holographic scanner are used in an optical scanner unit.

Referring to FIG. 18, a first laser beam emitted from a first laser unit 63a travels to a hologram disk 87 rotated at a predetermined speed by the motor 83 via a beam shaping optical system 64a, a reflection mirror 71a and a mirror 76a having an aperture. A second laser beam emitted from a second laser unit 63b travels to the hologram disk 87 via a beam shaping optical system 64b, a reflection mirror 71b and a mirror 76b having an aperture. The first laser beam has the same wavelength as that of the second laser beam. The first laser beam is incident onto a bottom surface of the hologram disk 84, and the second laser beam is incident on a top surface of the hologram disk 87. The hologram disk 87 has a plurality of holograms which are all of the same type. The first laser beam, after passing through the hologram disk 87, travels, as a reading light beam, to the document 84 via the mirror 76b, the f-θ lens 75 and the reflection mirrors 74. A light beam reflected by the document 84 is focused by a lens 77 on an optical sensor (e.g. a CCD). Thus, the optical reading process is carried out by use of the first laser beam. The second laser beam, after passing through the hologram disk 87, travels, as a writing light beam, to the optical writing system 81 via the mirror 76a and the f-θ lens 80, so that the optical writing process is carried out.

In the sixth embodiment, as the first laser beam used as the image reading light beam and the second laser beam used as the image writing light beam pass through the holograms of the same kind, the characteristics of an optical system used in the image reading process and the characteristics of an optical system used in the image writing process are the same. Thus, the optical systems in this optical scanner unit can be easily formed.

Figure 19:
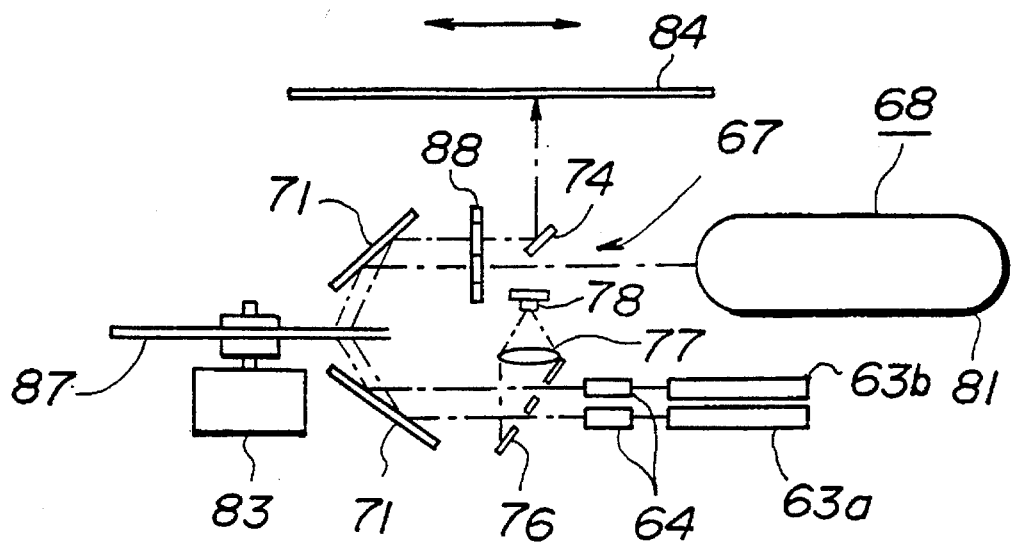
FIG. 19 is a diagram illustrating an optical scanner unit according to a seventh embodiment of the present invention.

A description will now be given of a seventh embodiment of the present invention with reference to FIGS. 19, 20A and 20B. In FIG. 19, those parts which are the same as those shown in FIGS. 14, 16 and 18 are given the same reference numbers. In this embodiment, two laser units respectively used in the image reading process and in the image writing process are mounted in an optical scanner unit.

Referring to FIG. 19, a first laser beam emitted from the first laser unit 63a and a second laser beam emitted by the a second laser unit 63b travel to the hologram disk 87 rotated at a predetermined speed by the motor 83 via a pair of the beam shaping optical systems 64, the mirror 76 having apertures and the reflection mirror 71. The wavelengths of the first and second laser beams differ from each other. The first laser beam, after passing through the hologram disk 87, travels to the document 84 via the reflection mirror 71, a hologram plate 88 and the reflection mirror 74. The first laser beam spot moves on the document 84 in a direction parallel to the width of the document 84. The document 84 can be moved in a direction perpendicular to the direction in which the first laser beam spot moves on the document 84. That is, the two dimensional scanning of the document 84 is carried out by the rotation of the hologram disk 87 and the movement of the document 84. A light beam reflected by the document 84 turns back through the same optical path as that in which first laser beam travels. Then the light beam is reflected by the mirror 76 and focused on the optical sensor 78 by the lens 77. That is, optical elements in an optical path in which the first laser beam, used as the image reading light beam, travels form a recursive optical system. The second laser beam, after passing through the hologram disk 87 travels to the optical writing system 81 via the mirror 71 and the hologram plate 88. That is, the second laser beam is used as the image writing light beam.

Figure 20A:
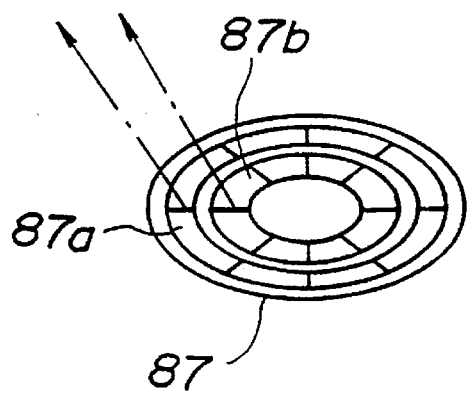
FIG. 20A is a detailed diagram illustrating a hologram disk shown in FIG. 19.
Figure 20B:
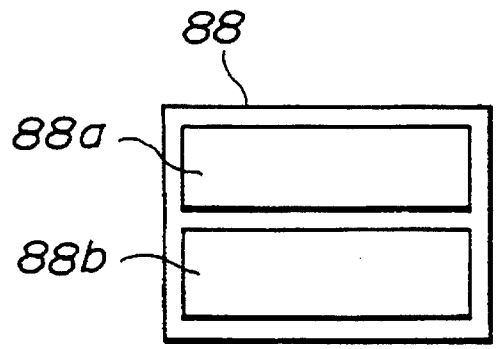
FIG. 20B is a detailed diagram illustrating a holographic plate shown in FIG. 19.

The hologram disk 87 has first type holograms 87a and second type holograms 87b which are concentrically arranged, as shown in FIG. 20A. The first laser beam passes through the first type holograms 87a, and the second laser beam passes through the second type holograms 87b. In addition, the hologram plate 88 also has a first type hologram 88a and a second type hologram 88b. Optical characteristics of the first type holograms 87a and 88a of the hologram disk 87 and the hologram plate 88 are adjusted so that the first laser beam can accurately scan the document 84. The first type holograms 87a and 88a, for example, correct an aberration of the optical system with respect to the first laser beam and a linearity of the scanning line formed by the first laser beam. Optical characteristics of the second type holograms 87b and 88b of the hologram disk 87 and the hologram plate 88 are adjusted so that the second laser beam can accurately scan the photosensitive member in the optical writing system 81.

The wavelength of the first laser beam used as the optical reading light beam and the wave length of the second laser beam used as the optical writing light beam are independently set. The wave length of the first laser beam is such that various colored images on the document 84 can be accurately read. For example, a green laser beam is used as the first laser beam. The wavelength of the second laser beam is set based on a high level of sensitivity of the photosensitive member in the optical writing system so that latent images can be certainly formed, by the second laser beam, on the photosensitive member.

The present invention is not limited to the aforementioned embodiments, and variations and modifications may be made without departing from the scope of the claimed invention.

What is claimed is:

1. An optical scanner unit for scanning a document comprising:

light source means for emitting a light beam used for scanning the document;

an optical system in which the light beam emitted from said light source means travels to the document and a reflection light beam obtained by reflection of the light beam on the document returns back through said optical system, said optical system having scanning means for moving the light beam which passes through said optical system so that a two dimensional scanning of the document is carried out by the light beam; and detection means, coupled to said optical system, for detecting the reflection light beam returning back through said optical system;

wherein an image formed on the document is read based on results obtained by said detection means.

2. An optical scanner unit as claimed in claim 1, wherein said scanning means comprises first scanning means for moving the light beam on the document in a first direction and second scanning means for moving the light beam in a second direction perpendicular to said first direction.

3. An optical scanner unit as claimed in claim 2, wherein said first scanning means comprises a polygonal mirror rotated at a predetermined speed, the light beam, reflected by said polygonal mirror, being swung within a predetermined angle range in synchronism with the rotation of said polygonal mirror so that the light beam is moved on the document in the first direction.

4. An optical scanner unit as claimed in claim 2, said second scanning means comprises optical elements for moving the light beam, supplied from said first scanning means under, a condition in which an optical length in said optical system is maintained at a constant value.

5. An optical scanner unit as claimed in claim 4, wherein said optical elements include an anamorphic optical element.

6. An optical scanner unit as claimed in claim 4, wherein said optical elements include a hologram plate through which the light beam passes, so that an aberration of said optical system with respect to the light beam is corrected.

7. An optical scanner unit as claimed in claim 6, wherein said hologram plates has anamorphic characteristic.

8. An optical scanner unit as claimed in claim 2, wherein said first scanning means comprises a hologram disk rotated at a predetermined speed, said hologram disk having a plurality of holograms, the light beam, diffracted by said hologram disk, being swung within a predetermined angle range in synchronism with the rotation of said hologram disk so that the light beam is moved on the document in the first direction.

9. An optical scanner unit for scanning a document comprising:

light source means for emitting a plurality of light beams whose wavelengths differ from each other, said plurality of light beams being used for scanning the document;

an optical system in which said plurality of light beams emitted from said light source means travel to the document, said optical system having scanning means for moving said plurality of light beams which pass through said optical system so that a two dimensional scanning of the document is carried out by said plurality of light beams; and detection means, coupled to said optical system, for detecting reflection light beams obtained by reflection of said plurality of light beams;

wherein an image formed on the document is read based on results obtained by said detection means; and wherein said optical system is formed so that the reflection light beams can return back through said optical system, and wherein said detection means detects the reflection light beams returning back through said optical system.

10. An optical scanner unit as claimed in claim 9, wherein said light source means emits a mixed light beam which is a combination of said plurality of light beams.

11. An optical scanner unit as claimed in claim 9, wherein said light source means comprises a plurality of light source units respectively emitting said plurality of light beams.

12. An optical scanner unit as claimed in claim 9, wherein said optical system has a plurality of optical paths in which said plurality of light beams respectively travel to the document.

13. An optical scanner unit as claimed in claim 9, wherein said detection means comprises a plurality of optical sensors for respectively detecting said plurality of light beams.

14. An optical scanner unit as claimed in claim 9, wherein said optical system has mixing means for combining said plurality of light beams into a mixed light beam and for outputting said mixed light beam so that the mixed light beam is projected on the document.

15. An optical scanner unit as claimed in claim 9, wherein said scanning means comprises a polygonal mirror rotated at a predetermined speed, said plurality of light beams, reflected by said polygonal mirror, being swung within a predetermined angle range in synchronism with the rotation of said polygonal mirror so that said plurality of light beams are moved on the document in a predetermined direction.

16. An optical scanner unit as claimed in claim 9, wherein said scanning means comprises a hologram disk rotated at a predetermined speed, said hologram disk having a plurality of holograms, said plurality of light beams, diffracted by said hologram disk, being swung within a predetermined angle range in synchronism with the rotation of said hologram disk so that said plurality of light beams are moved on the document in a predetermined direction.

17. An optical scanner unit as claimed in claim 16, wherein said holograms of said hologram disk include at least first and second holograms, and wherein a first light beam of said plurality of light beams passes through said first hologram, and a second light beam of said plurality of light beams passes through said second hologram.

18. An optical scanner unit as claimed in claim 9, wherein said optical system has a hologram plate having a plurality of holograms each hologram having wavelength and aberration correcting characteristics corresponding to those of a respective one of said plurality of light beams, and each of said plurality of light beams passes through a respective hologram so that aberrations of said optical system with respect to said plurality of light beam are corrected.

19. An optical scanner unit for scanning a document comprising:

light source means for emitting a plurality of light beams whose wavelengths differ from each other, said plurality of light beams being used for scanning the document;

an optical system in which said plurality of light beams emitted from said light source means travel to the document, said optical system having scanning means for moving said plurality of light beams which pass through said optical system so that a two dimensional scanning of the document is carried out by said plurality of light beams; and detection means, coupled to said optical system, for detecting reflection light beams obtained by reflection of said plurality of light beams;

wherein an image formed on the document is read based on results obtained by said detection means; and wherein said light source means comprises a light source unit for emitting an original light beam having a predetermined wavelength and a light beam generating means for receiving said original light beam and generating said plurality of light beams from said original light beam emitted from said light source unit.

20. An optical scanner unit as claimed in claim 19, wherein said light beam generating means has a second harmonic generator (SHG) element for generating a second harmonic of said original light beam.

21. An optical scanner unit for scanning a document comprising:

light source means for emitting a plurality of light beams whose wavelengths differ from each other, said plurality of light beams being used for scanning the document;

an optical system in which said plurality of light beams emitted from said light source means travel to the document, said optical system having scanning means for moving said plurality of light beams which pass through said optical system so that a two dimensional scanning of the document is carried out by said plurality of light beams; and detection means, coupled to said optical system, for detecting reflection light beams obtained by reflection of said plurality of light beams;

wherein an image formed on the document is read based on results obtained by said detection means; and wherein said optical system has a plurality of optical paths in which said plurality of light beams respectively travel, and focusing means for focusing said plurality of light beams passing through said optical paths at the same position on said document.

22. An optical scanner unit comprising:

light source means for emitting a first light beam used for scanning a document and a second light beam used for writing images on a recording medium;

scanning means for moving an input light beam in a predetermined direction;

an input optical system in which said first and second light beams emitted from said light source means travel to said scanning means so that each of said first and second light beams is, as an input light, incident to said scanning means;

a first optical system in which said first light beam, moved by said scanning means, travels to the document so that the document is scanned by said first beam;

detection means for detecting a reflection light beam obtained by a reflection of said first light beam on the document, so that an image formed on the document is read based on results obtained by said detection means; and a second optical system in which said second light beam, moved by said scanning means, travels to the recording medium, so that an image is written on the recording medium.

23. An optical scanner unit as claimed in claim 22, wherein said light source means comprises a first light source unit emitting said first light beam and a second light source unit emitting said second light beam.

24. An optical scanner unit as claimed in claim 22, wherein said light source means comprises a light source unit for emitting an original light beam having a predetermined wavelength, and light beam generation means for generating said first light beam, which has the same wavelength as the original light beam, and said second light beam, based on said original light beam, said second light beam having a wavelength which is less than that of the original light beam.

25. An optical scanner unit as claimed in claim 22, wherein said first optical system and said input optical system are formed so that the reflection light beam can turn back through said first optical system and said input optical system, and wherein said detection means detects the reflection light beam turning back through said first optical system and said input optical system.

26. An optical scanner unit as claimed in claim 22, wherein said scanning means comprises a polygonal mirror rotated at a predetermined speed, said first and second light beams, reflected by said polygonal mirror, being swung within a predetermined angle range in synchronism with the rotation of said polygonal mirror.

27. An optical scanner unit as claimed in claim 22, wherein said scanning means comprises a hologram disk rotated at a predetermined speed, said hologram disk having first holograms, each having optical characteristics corresponding to said first light beam, and second holograms, each having optical characteristics corresponding to said second light beam, said first light beam diffracted by said first holograms, and second light beam, diffracted by said second holograms, being swung in a predetermined angle range in synchronism with the rotation of said hologram disk.

28. An optical scanner unit as claimed in claim 22, wherein said first optical system has a hologram having optical characteristics corresponding to said first light beam so that an aberration of said first optical system with respect to said first light beam is corrected.

29. An optical scanner unit as claimed in claim 22, wherein said second optical system has a hologram having optical characteristics corresponding to said second light beam so that an aberration of said second optical system with respect to said second light beam is corrected.

30. An optical scanner unit comprising:

light source means for emitting a light beam;

scanning means for moving an input light beam in a predetermined direction;

an input optical system in which said light beam emitted from said light source means travels to said scanning means so that said light beam is, as an input light, incident to said scanning means;

a first optical system in which said light beam moved by said scanning means travels to a document so that the document is scanned by said light beam;

detection means for detecting a reflection light beam obtained by the reflection of said light beam on the document, so that an image formed on the document is read based on results obtained by said detection means;

a second optical system in which said light beam moved by said scanning means travels to a recording medium, so that an image is written on the recording medium; and selecting means for selecting either said first optical system or said second optical system in accordance with an external controller.

31. An optical scanner unit as claimed in claim 30, wherein said first optical system and said input optical system are formed so that the reflection light beam can turn back through said first optical system and said input optical system, and wherein said detection means detects said reflection light beam turning back through said first optical system and said input optical system.

* * * * *